(12) United States Patent
Wang et al.

(10) Patent No.: US 8,508,209 B2
(45) Date of Patent: Aug. 13, 2013

(54) SWITCHING REGULATOR AND CONTROL CIRCUIT THEREOF AND INPUT VOLTAGE DETECTION METHOD THEREFOR

(75) Inventors: Jo-Yu Wang, New Taipei (TW); Wei-Jhih Wen, Taichung (TW)

(73) Assignee: Richtek Technology Corporation, R.O.C., Chupei, Hsin-Chu (TW)

( * ) Notice: Subject to any disclaimer, the term of this patent is extended or adjusted under 35 U.S.C. 154(b) by 1 day.

(21) Appl. No.: 13/200,162

(22) Filed: Sep. 20, 2011

(65) Prior Publication Data
US 2013/0002226 A1    Jan. 3, 2013

(30) Foreign Application Priority Data
Jul. 1, 2011   (TW) .............................. 100123347 A (51) Int. Cl.
*G05F 1/00* (2006.01)

(52) U.S. Cl.
USPC ............................. 323/285; 323/284; 323/290

(58) Field of Classification Search
USPC .................................. 323/282, 284, 285, 290
See application file for complete search history.

(56) References Cited

U.S. PATENT DOCUMENTS

| | | | |
|---|---|---|---|
| 7,233,131 B2 | 6/2007 | Lin et al. | |
| 7,498,791 B2 * | 3/2009 | Chen | 323/284 |
| 7,764,053 B2 * | 7/2010 | Mehas et al. | 323/222 |
| 8,044,642 B2 * | 10/2011 | Sakai et al. | 323/224 |
| 8,421,425 B1 * | 4/2013 | Wu et al. | 323/223 |
| 8,456,143 B2 * | 6/2013 | Nakashima | 323/224 |
| 2009/0160412 A1 * | 6/2009 | Latham et al. | 323/282 |
| 2010/0181984 A1 * | 7/2010 | Fukushi et al. | 323/284 |

* cited by examiner

*Primary Examiner* — Adolf Berhane
*Assistant Examiner* — Lakaisha Jackson
(74) *Attorney, Agent, or Firm* — Tung & Associates (57) ABSTRACT

The present invention discloses a switching regulator including: a power stage having an upper gate device and a lower gate device coupled with each other, for converting an input voltage to an output voltage and generating a phase voltage at a node between the upper gate device and the lower gate device; and a control circuit including: a switch operation circuit controlling the power stage, the switch operation circuit generating a test signal turning on the upper gate device for a period of time and then turning it off; and a comparator for generating a ready signal indicating that the input voltage is ready according to comparison between the phase voltage and a reference voltage after the upper gate device is turned off.

11 Claims, 7 Drawing Sheets

Fig.1A (Prior Art)

Vin is ready (real case)

SWITCHING REGULATOR AND CONTROL CIRCUIT THEREOF AND INPUT VOLTAGE DETECTION METHOD THEREFOR

CROSS REFERENCE

The present invention claims priority to TW 100123347, filed on Jul. 1, 2011.

BACKGROUND OF THE INVENTION

1. Field of Invention

The present invention relates to a switching regulator, in particular to one that can more correctly determine whether an input voltage of a power stage is ready, and a control circuit thereof and an input voltage detection method therefor.

2. Description of Related Art

A switching regulator is for converting an input voltage to an output voltage (or an output current) and it generally includes a control chip controlling a power stage. The control chip and the power stage may be provided with power by different power supplies respectively. When the power supply for the control chip is ready to perform a soft-start, it is necessary to make sure that the power supply for the power stage is also ready. If the soft-start is performed but the power supply for the power stage is not ready, the whole circuit may be damaged.

Figure 1A:
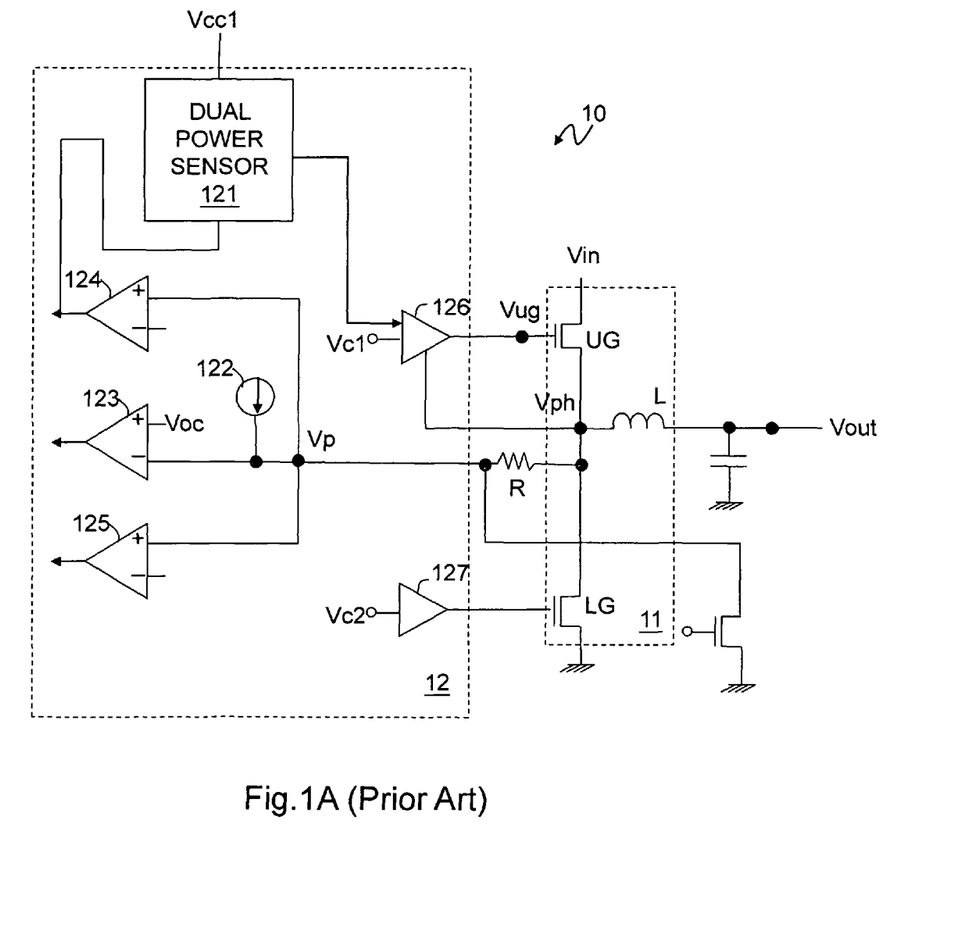
FIG. 1A shows a schematic circuit diagram of a prior art switching regulator.
Figure 1B:
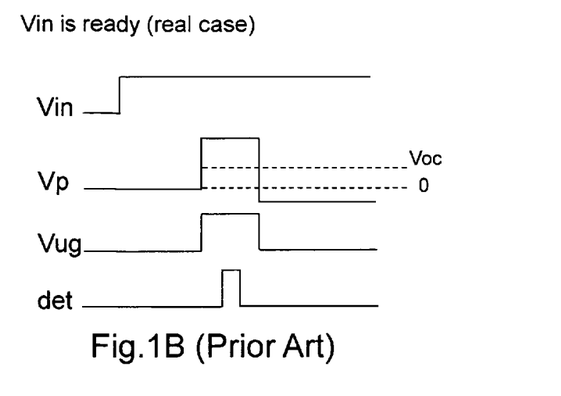
FIGS. 1B-1D show that the prior art cannot correctly determine whether an input voltage of a power stage is ready.
Figure 1C:
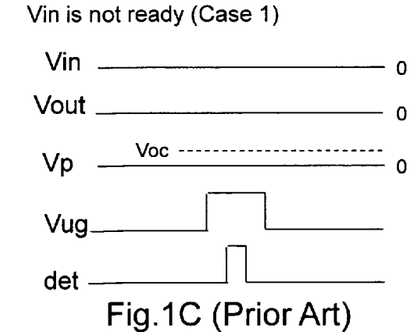

To solve this problem, U.S. Pat. No. 7,233,131 proposes a switching regulator that can determine whether the power supply for the power stage is ready. Referring to FIG. 1A, the prior art switching regulator 10 includes a power stage 11 and a control chip 12 including: a dual power sensor 121; a current source 122 for performing over-current protection; a first comparator 123; a second comparator 124; a third comparator 125; a first driver gate 126; and a second driver gate 127. The control chip 12 generates test signals Vc1 and Vc2 to turn on an upper gate device UG of the power stage 11 and to turn off an lower gate device LG of the power stage 11 so that the first comparator 122 can determine whether the input voltage Vin is ready by comparing a dividend voltage Vp of a phase voltage Vph with a over-current threshold voltage Voc. As shown in FIG. 1B, when the input voltage Vin is ready, the phase voltage Vph equals to the input voltage Vin, so the dividend voltage Vp is higher than the voltage Voc. As shown in FIG. 1C, when the input voltage Vin is not ready (Vin=0V, as shown in the figure) and the upper gate device UG is turned on, the phase voltage Vph equals to the input voltage Vin (Vin equals to ground, 0V), so the voltage Vp is lower than the voltage Voc. Thus, at a proper timing (such as a timing indicated by a detection signal det in the figures), the voltage Vp can be compared with the voltage Voc after the upper gate device UG is turned on, and the comparison result can determine whether the input voltage Vin is ready.

Figure 1D:
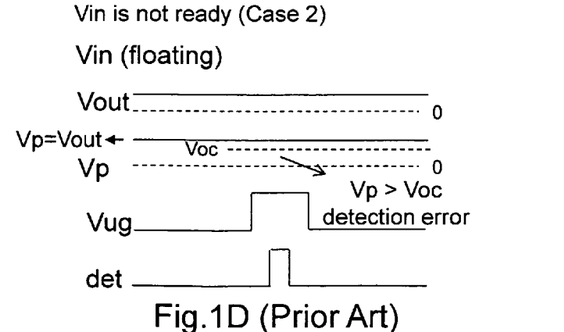

But FIG. 1C only shows an ideal case; in a real case, the output voltage Vout does not necessarily equal to ground (0V). In the case shown in FIG. 1D, when the input voltage Vin is not ready (Vin is floating, as shown in the figure) and the upper gate device UG is turned on, the phase voltage Vph equals to the output voltage Vout. If there are remnant charges at the output node Vout of the power stage 11, the dividend voltage Vp of the phase voltage Vph may be higher than the voltage Voc. Thus, in the case shown in FIG. 1D, the prior art incorrectly determines that the input voltage Vin is ready, so the soft-start is performed when the input voltage Vin of the power stage 11 is actually not ready, and it still damages the whole circuit.

In view of the above, the present invention proposes a switching regulator, a control circuit thereof and an input voltage detection method therefor, which can more correctly determine whether the input voltage Vin is ready, to overcome the drawbacks in the prior art.

SUMMARY OF THE INVENTION

An objective of the present invention is to provide a switching regulator.

Another objective of the present invention is to provide a control circuit of the switching regulator.

A further other objective of the present invention is to provide input voltage detection method for the switching regulator.

To achieve the foregoing objectives, in one perspective of the present invention, it provides a switching regulator, comprising: a power stage having an upper gate device and a lower gate device coupled with each other, for converting an input voltage to an output voltage and generating a phase voltage at a node between the upper gate device and the lower gate device; and a control circuit including: a switch operation circuit controlling the power stage, the switch operation circuit generating a test signal turning on the upper gate device for a period of time and then turning it off; and a comparator for generating a ready signal indicating that the input voltage is ready according to comparison between the phase voltage and a reference voltage after the upper gate device is turned off.

In another perspective of the present invention, it provides a control circuit of a switching regulator, the switching regulator including a power stage having an upper gate device and a lower gate device coupled with each other, for converting an input voltage to an output voltage and generating a phase voltage at a node between the upper gate device and the lower gate device, the control circuit comprising: a switch operation circuit controlling the power stage, the switch operation circuit generating a test signal turning on the upper gate device for a period of time and then turning it off; and a comparator for generating a ready signal indicating that the input voltage is ready according to comparison between the phase voltage and a reference voltage after the upper gate device is turned off.

The foregoing switching regulator or control circuit may further include an over-current protection circuit, and the comparator may include a switch which selects one of the reference voltage and an over-current threshold voltage as an input to the comparator to be compared with the phase voltage; the over-current protection circuit is selectively coupled to an output terminal of the comparator when the input of the comparator receives the over-current threshold voltage.

In the foregoing switching regulator or control circuit, the reference voltage is preferably within the following range: 0>Vref>−vf, wherein Vref is the reference voltage and Vf is a forward bias voltage of a diode.

In yet another perspective of the present invention, it provides an input voltage detecting method, comprising: providing a power stage having an upper gate device and a lower gate device coupled with each other, for converting an input voltage to an output voltage and generating a phase voltage at a node between the upper gate device and the lower gate device; generating a test signal turning on the upper gate device for a period of time and then turning it off; and comparing the phase voltage with a reference voltage after the upper gate device is turned off, wherein when the phase voltage is negative and its absolute value is higher than the reference voltage, a ready signal is generated for indicating that the input voltage is ready.

The objectives, technical details, features, and effects of the present invention will be better understood with regard to the detailed description of the embodiments below, with reference to the drawings.

DESCRIPTION OF THE PREFERRED EMBODIMENTS

Figure 2A:
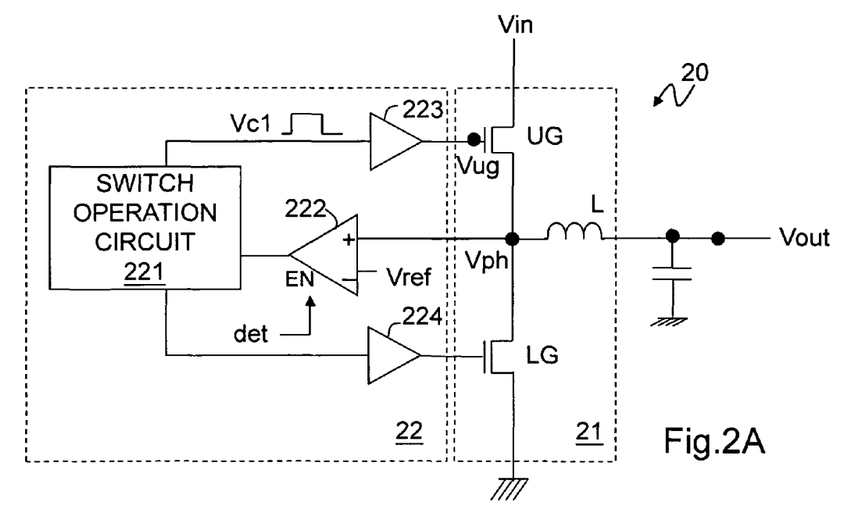
FIG. 2A shows an embodiment of the present invention.

Please refer to FIG. 2A for a switching regulator 20 of the present invention, which includes a power stage 21 and a control circuit 22. The control circuit 22 can be integrated with other circuits into one control chip. The control circuit 22 includes: a switch operation circuit 221, a comparator 222, a first driver gate 223 and a second driver gate 224. The present invention is different from the prior art in the reference setting and the comparison timing by the comparator 222. In detail, the switch operation circuit 221 of the present invention generates a test signal Vc1 for turning on an upper gate device UG for a period of time and then turning it off; and when the upper gate device UG is turned off, the comparator 222 compares a phase voltage Vph (or a dividend voltage of the phase voltage Vph) with a reference voltage Vref to determine whether an input voltage Vin is ready. The test signal Vc1 can be generated according to, for example, a power-on-reset signal during circuit start-up.

Figure 3A:
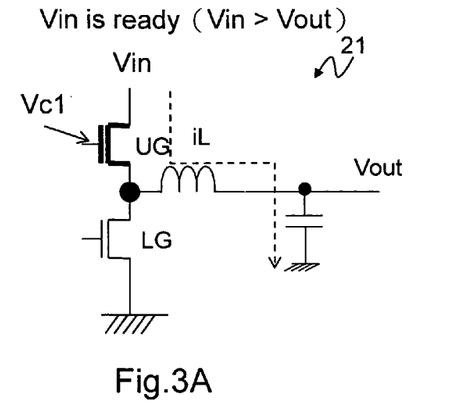
FIGS. 3A-3D explain how the present invention can correctly determine the input voltage of the power stage is ready.
Figure 3B:
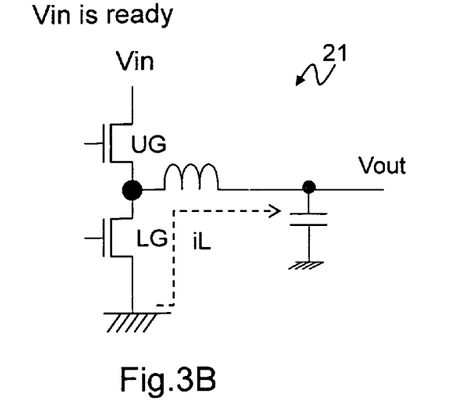
Figure 3C:
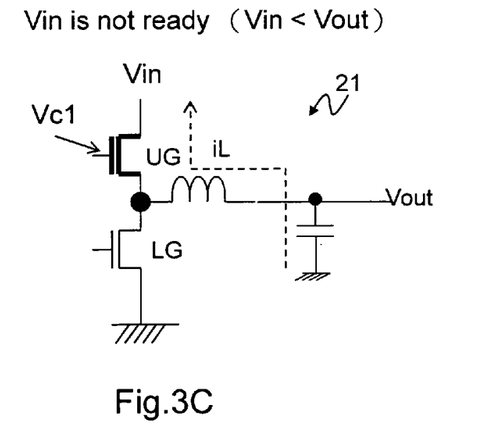
Figure 3D:
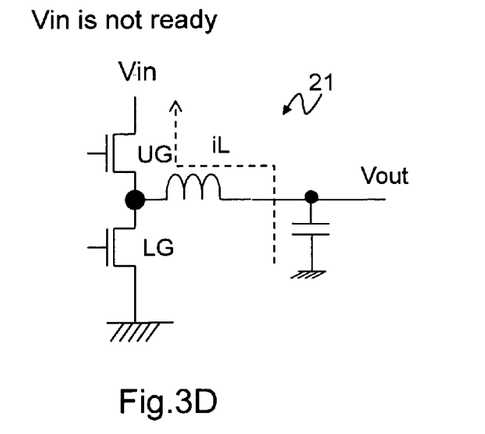

Please refer to FIGS. 3A-3D to understand how the present invention can correctly determine whether the input voltage Vin is ready. FIGS. 3A-3B show a case that the input voltage Vin is ready, and FIGS. 3C-3D show a case that the input voltage Vin is not ready. As shown in FIG. 3A, when the input voltage Vin is ready and the upper gate device UG is turned on by the test signal Vc1 (assuming that the upper gate device UG is an NMOS transistor, and therefore the upper gate node Vug is at high level; if the upper gate device UG is a PMOS transistor, then the signal should be inverted), a current iL flows from the input Vin of the power stage 21 to the output Vout of the power stage 21, and thus the phase voltage Vph substantially equals to the input voltage Vin. Then, as shown in FIG. 3B, after the test signal Vc1 is terminated, the upper gate device UG is turned off (the upper gate node Vug is at low level when the upper gate device UG is an NMOS transistor). Because of the effect of the inductor L, a current iL flows from ground through the lower gate device LG (the lower gate device LG is not limited to the transistor shown in the figure, but can be a diode instead) to the output Vout. During this period, the difference between the phase voltage Vph and ground at least equals to a forward bias voltage Vf of a body diode in the lower gate device LG. In other words, when the upper gate device UG is turned on and then turned off according to the test steps shown in FIGS. 3A-3B, if the input voltage Vin is ready, the phase voltage Vph will be negative and its absolute value is at least equal to the forward bias voltage Vf.

FIGS. 3C-3D show a case that the input voltage Vin is not ready and there are remnant charges at the output node Vout of the power stage 21. As shown in FIG. 3C, when the upper gate device UG is turned on by the test signal Vc1, a current iL flows from the output Vout of the power stage 21 to the input Vin of the power stage 21, and thus the phase voltage Vph substantially equals to the output voltage Vout. Then, after the test signal Vc1 is terminated, the upper gate device UG is turned off. During this period, a current iL still flows from the output Vout, through the body diode of the upper gate device UG, to the input Vin. Thus, the phase voltage Vph at least equals to the sum of the input voltage Vin and the forward bias voltage Vf of the body diode of the upper gate device UG (Vph=Vin+Vf). Because the input voltage Vin at least equals to 0 and is not negative, the phase voltage Vph is positive (that is, Vph>0>–Vf).

Furthermore, in a case that the input voltage Vin is not ready but there is no remnant charge at the output node Vout, when the upper gate device UG is turned on by the test signal Vc1, there is no voltage difference between the two sides of the inductor L, so no inductor current is generated. When the test signal Vc1 is terminated, the upper gate device UG is turned off; during this period, there is still no current, so the phase voltage Vph is 0V.

According to the above, whether the input voltage Vin is ready can be determined by the followings:

$$\begin{cases} \text{if } Vph \leq -Vf, Vin \text{ is ready;} \\ \text{if } Vph \geq 0, Vin \text{ is not ready.} \end{cases}$$

Figure 2B:
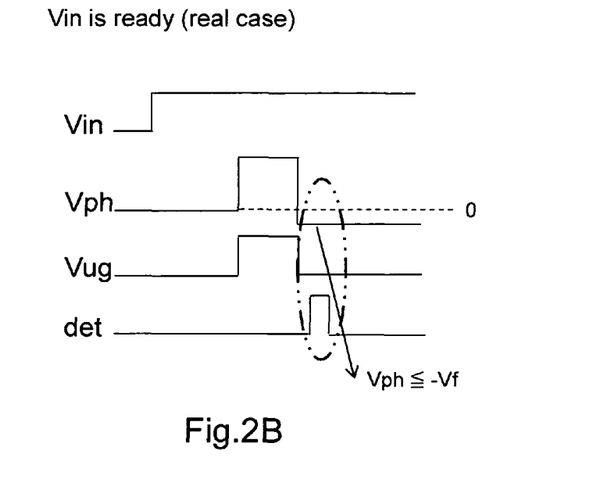
FIGS. 2B-2D show that the present invention can correctly determine whether the input voltage of the power stage is ready.
Figure 2C:
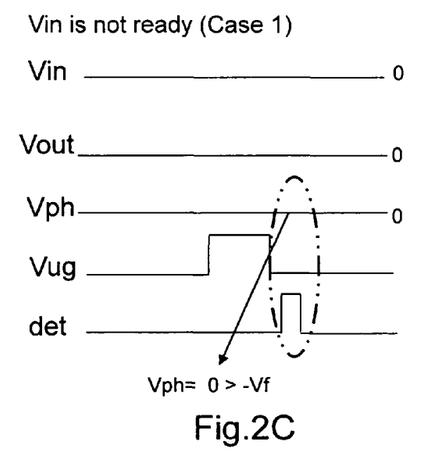
Figure 2D:
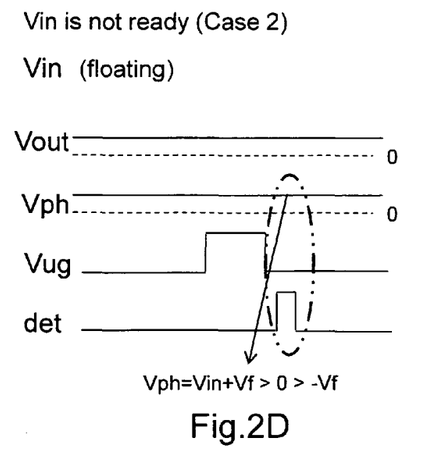

Please refer back to FIGS. 2A-2D which show that the present invention detects the phase voltage Vph at a different timing with different mechanism from the prior art so that the present invention can more correctly determine whether the input voltage Vin is ready. In FIG. 2A, the reference voltage Vref can be at any level that is higher than –Vf and lower than 0. As shown in FIG. 2B, in a case that the input voltage Vin is ready, if the upper gate device UG is turned on for a period of time and then turned off, the phase voltage Vph will be lower than or equal to –Vf. Therefore, a detection signal det can be generated when or shortly after the upper gate device UG is turned off; enabled by the detection signal det, the comparator 222 compares the phase voltage Vph with the reference voltage Vref. As explained with reference to FIGS. 3C-3D, if Vph≦–Vf, the input voltage Vin is ready. In addition, as shown in FIG. 2C, in a case that the input voltage Vin is not ready (Vin is floating) and there is no remnant charge at the output node Vout (Vout=0V), the phase voltage Vph will be equal to 0V, that is, Vph=0>–Vf. And as shown in FIG. 2D, in a case that the input voltage Vin is not ready (Vin is floating) and there are remnant charges at the output node Vout, the phase voltage Vph will be higher than the reference voltage Vref, that is, Vph>0>–Vf. Compared with FIGS. 1B-1D, the above shows that the present invention is better than the prior art because the present invention can correctly determine whether the input voltage Vin is ready when there are remnant charges at the output node Vout of the power stage 21.

Figure 4:
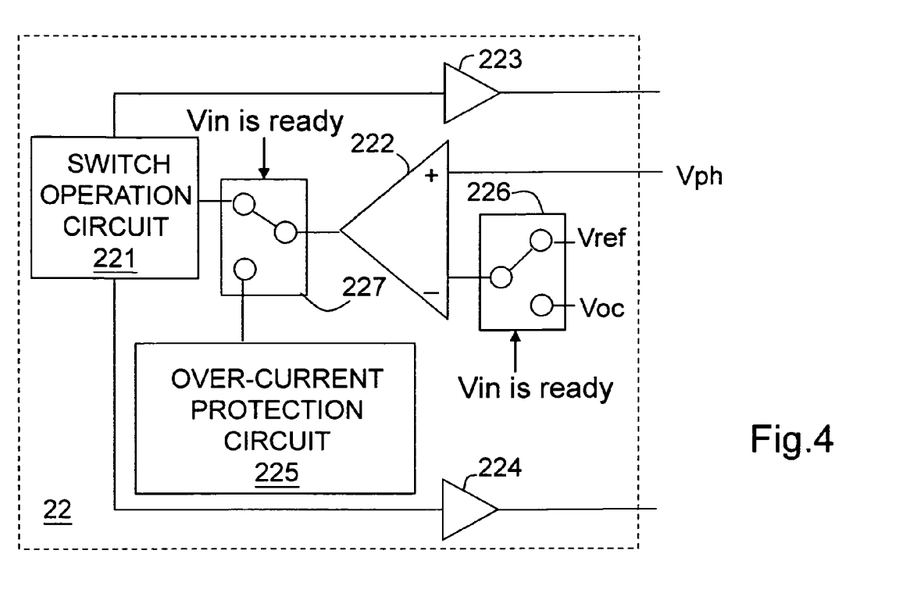
FIG. 4 shows another embodiment of the present invention.
Figure 5A:
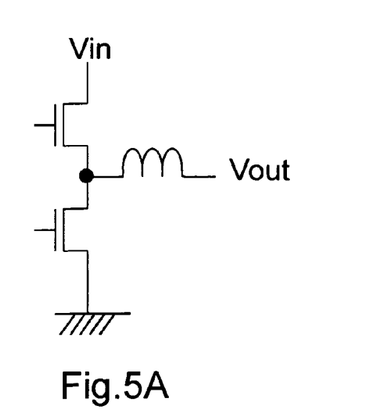
FIGS. 5A-5H show several embodiments of a power stage.
Figure 5B:
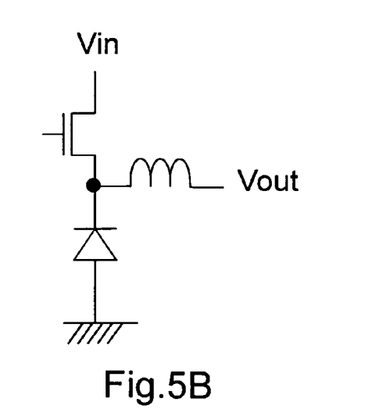
Figure 5C:
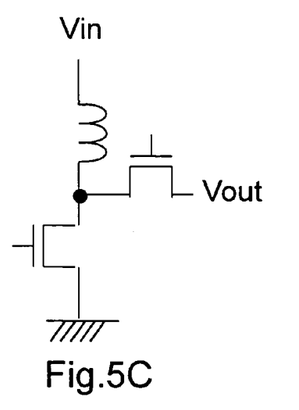
Figure 5D:
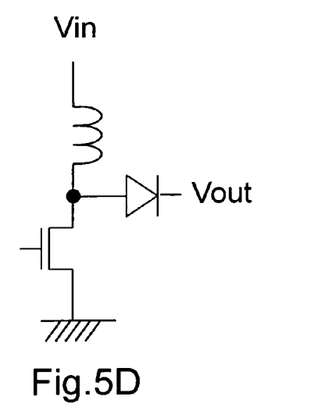
Figure 5E:
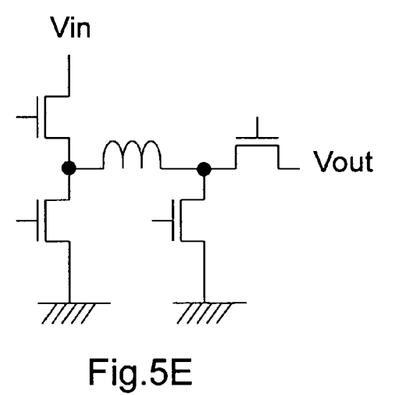
Figure 5F:
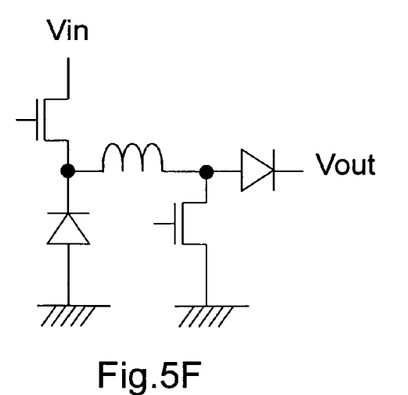
Figure 5G:
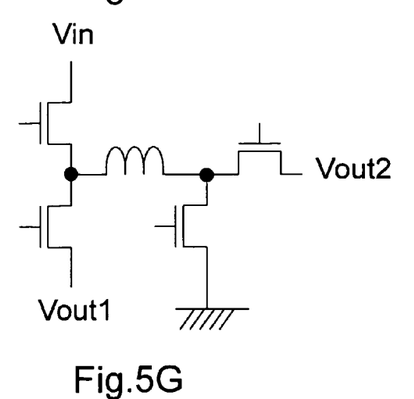
Figure 5H:
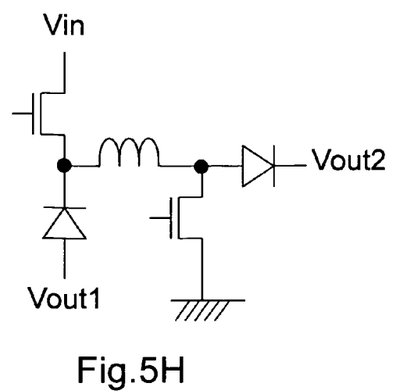

FIG. 4 shows another embodiment of the present invention, wherein the control circuit 22 may further include an over-current protection circuit 225, and the comparator 222 (or the control circuit 22) may further include switches 226 and 227 so that the comparator 222 can selectively receive the reference voltage Vref or an over-current threshold voltage Voc as its input. The output of the comparator 222 is selectively transmitted to the switch operation circuit 221 or the over-current protection circuit 225. During circuit start-up, the comparator 222 compares the phase voltage Vph with the reference voltage Vref to determine whether the input voltage Vin is ready. After the input voltage Vin is ready, the switches 226 and 227 are switched to another state so that the comparator 222 can compare the phase voltage Vph with the over-current threshold voltage Voc to provide a comparison result to the over-current protection circuit 225. In other words, in this embodiment, the over-current protection circuit 225 and the switch operation circuit 221 can share one comparator 222.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not affect the primary functions of the circuits can be interposed between two devices or circuits shown to be in direct connection in the illustrated embodiments. As another example, the upper and lower gate power switches. UG and LG in the power stage 11 can be NMOSFETs or PMOSFETs or a combination of NMOSFET and PMOSFET. As yet another example, the power stage 11 can be other power stage converters instead of the synchronous buck converter, such as the synchronous or asynchronous buck, boost or boost-buck converter shown in FIGS. 5A-5H. Further, although it is shown that the comparator compares the phase voltage Vph with the reference voltage Vref, it can be modified such that the comparator compares a dividend voltage of the phase voltage Vph with a certain ratio of the reference voltage Vref; and the negative voltage can be compared as it is, or converted to an absolute value of the negative voltage and compared in that form. Thus, the present invention should cover all such and other modifications and variations, which should be interpreted to fall within the scope of the following claims and their equivalents.

What is claimed is:

1. A switching regulator, comprising:
a power stage having an upper gate device and a lower gate device coupled with each other, for converting an input voltage to an output voltage and generating a phase voltage at a node between the upper gate device and the lower gate device; and
a control circuit including:
a switch operation circuit controlling the power stage, wherein before the power stage starts converting the input voltage to the output voltage, the switch operation circuit generates a test signal turning on the upper gate device for a period of time and then turning it off; and
a comparator for generating a ready signal indicating that the input voltage is ready according to comparison between the phase voltage and a reference voltage after the upper gate device is turned off.

2. The switching regulator of claim 1, wherein the reference voltage is within the following range: 0>Vref>-vf, wherein Vref is the reference voltage and Vf is a forward bias voltage of a diode.

3. The switching regulator of claim 1, wherein the comparator further includes a switch which selects one of the reference voltage and an over-current threshold voltage as an input to the comparator to be compared with the phase voltage.

4. The switching regulator of claim 3, further comprising: an over-current protection circuit which is selectively coupled to an output terminal of the comparator when the input of the comparator receives the over-current threshold voltage.

5. The switching regulator of claim 1, wherein the power stage includes: a buck converter, a boost converter or a buck-boost converter.

6. A control circuit of a switching regulator, the switching regulator including a power stage having an upper gate device and a lower gate device coupled with each other, for converting an input voltage to an output voltage and generating a phase voltage at a node between the upper gate device and the lower gate device, the control circuit comprising:
a switch operation circuit controlling the power stage, wherein before the switching regulator starts converting the input voltage to the output voltage, the switch operation circuit generates a test signal turning on the upper gate device for a period of time and then turning it off; and
a comparator for generating a ready signal indicating that the input voltage is ready according to comparison between the phase voltage and a reference voltage after the upper gate device is turned off.

7. The control circuit of claim 6, wherein the reference voltage is within the following range: 0>Vref>-vf, wherein Vref is the reference voltage and Vf is a forward bias voltage of a diode.

8. The control circuit of claim 6, wherein the comparator further includes a switch which selects one of the reference voltage and an over-current threshold voltage as an input to the comparator to be compared with the phase voltage.

9. The control circuit of claim 8, further comprising: an over-current protection circuit which is selectively coupled to an output terminal of the comparator when the input of the comparator receives the over-current threshold voltage.

10. An input voltage detecting method, comprising:
providing a power stage having an upper gate device and a lower gate device coupled with each other, for converting an input voltage to an output voltage and generating a phase voltage at a node between the upper gate device and the lower gate device; and
before starting converting the input voltage to the output voltage, confirming whether the input voltage is ready by:
generating a test signal turning on the upper gate device for a period of time and then turning it off; and
comparing the phase voltage with a reference voltage after the upper gate device is turned off, wherein when the phase voltage is negative and its absolute value is higher than the reference voltage, a ready signal is generated for indicating that the input voltage is ready.

11. The method of claim 10, wherein the reference voltage is within the following range: 0>Vref>-vf, wherein Vref is the reference voltage and Vf is a forward bias of a diode.

* * * * *